June 23, 1931.  L. MAMBOURG  1,810,921
SHEET GLASS FLOWING APPARATUS
Original Filed Jan. 12, 1925   3 Sheets-Sheet 1
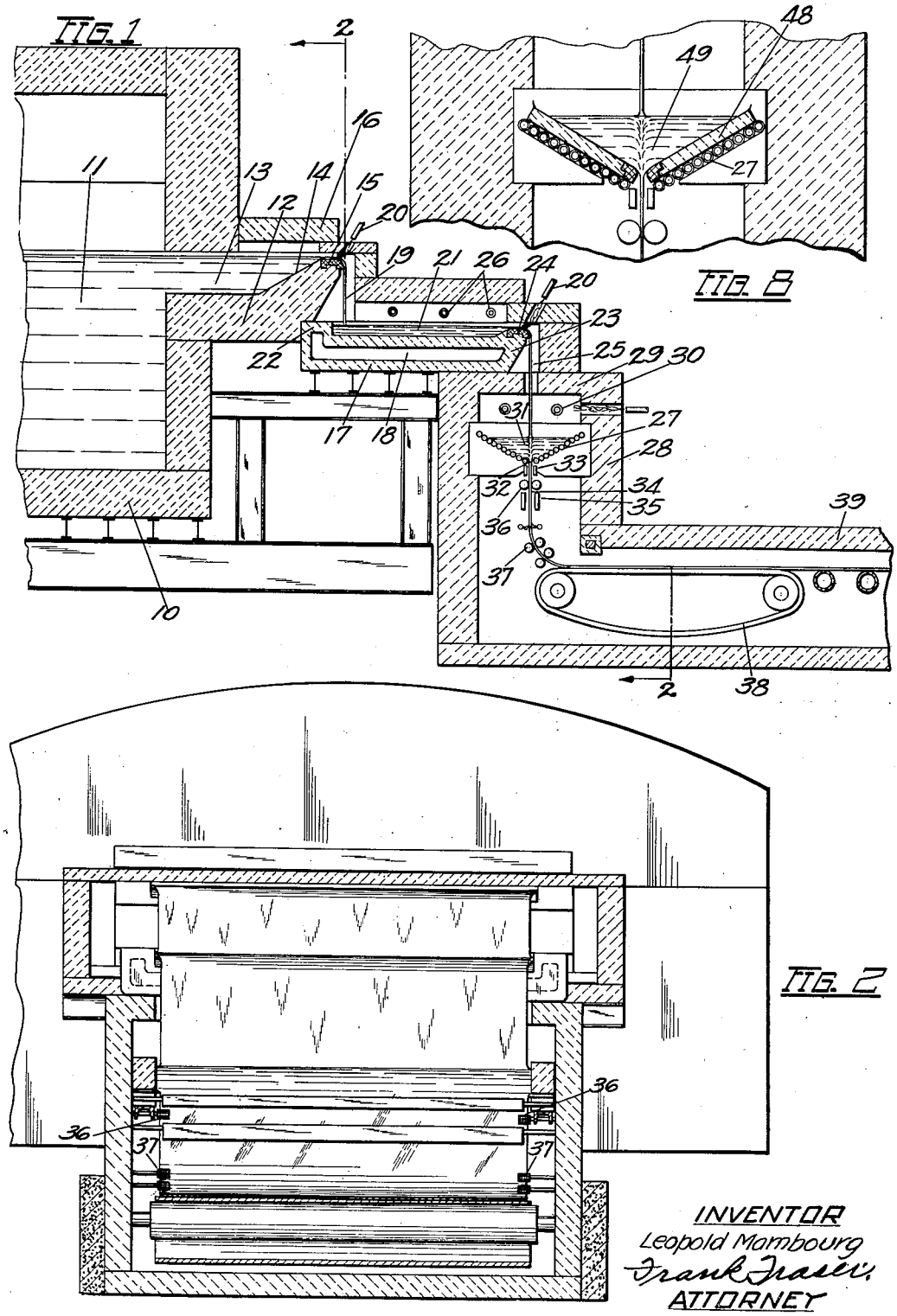

June 23, 1931. L. MAMBOURG 1,810,921
SHEET GLASS FLOWING APPARATUS
Original Filed Jan. 12, 1925 3 Sheets-Sheet 2
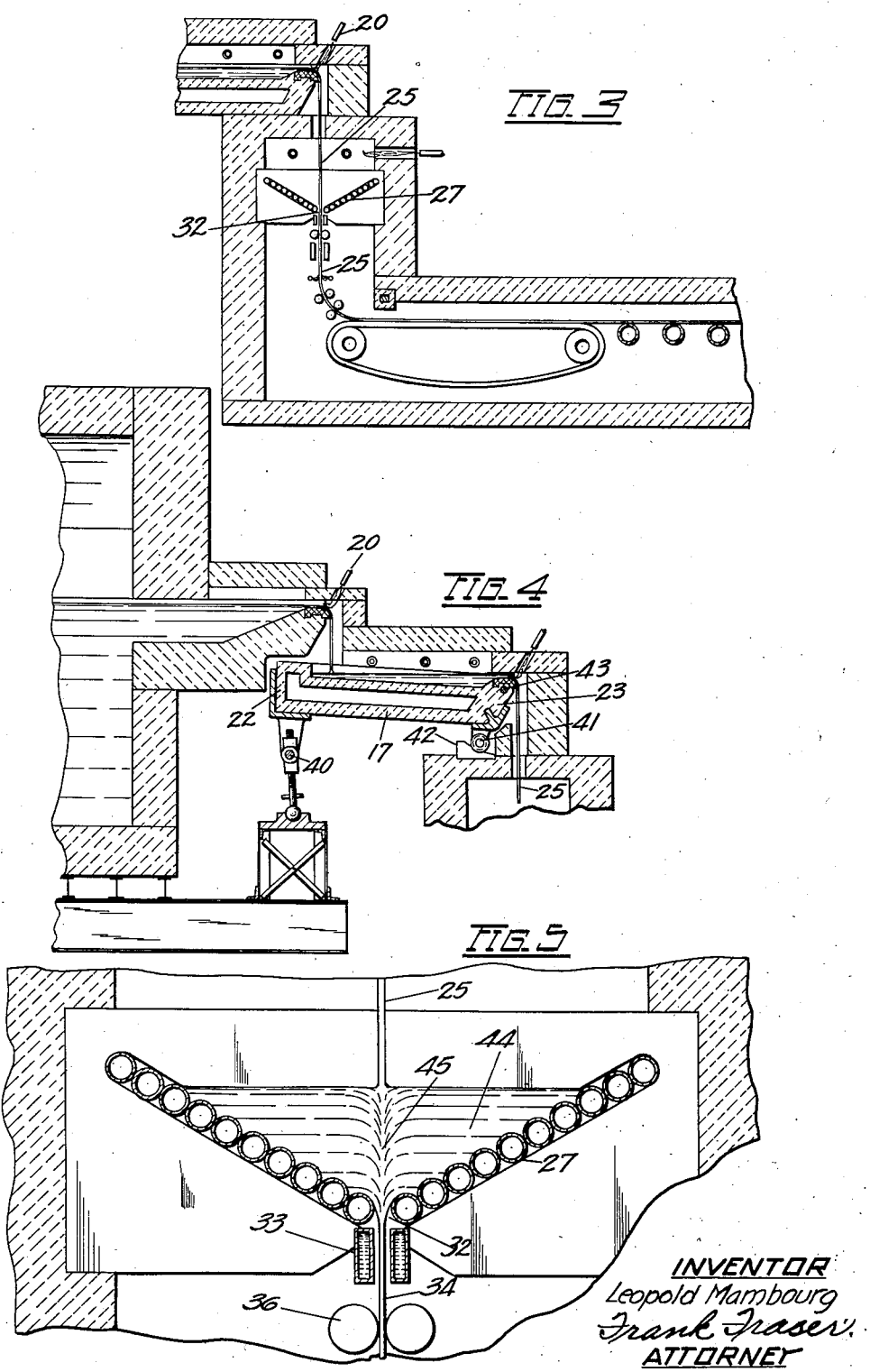
INVENTOR
Leopold Mambourg
Frank Fraser
ATTORNEY

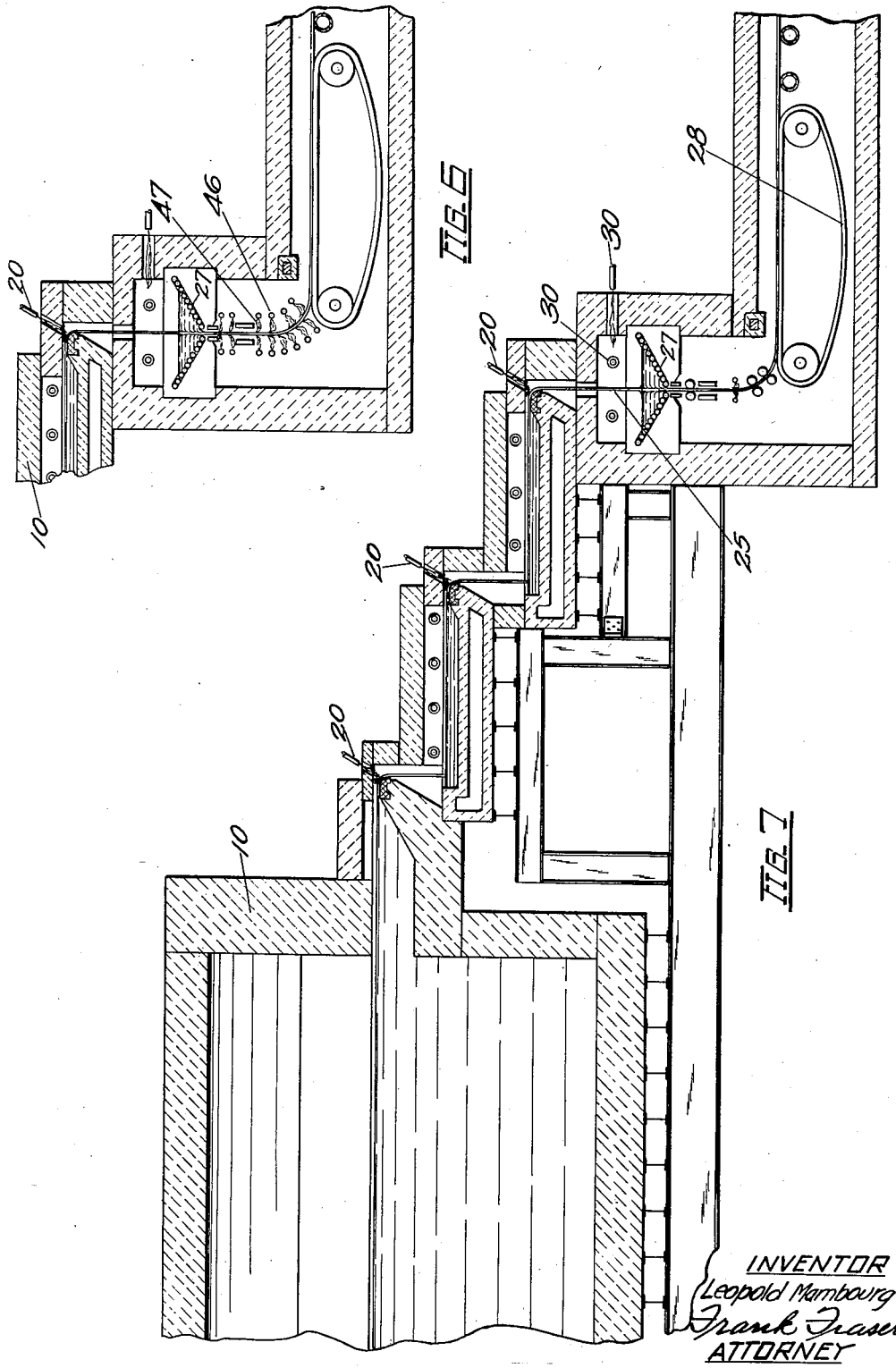

Patented June 23, 1931

1,810,921

UNITED STATES PATENT OFFICE

LEOPOLD MAMBOURG, OF LANCASTER, OHIO, ASSIGNOR TO LIBBEY-OWENS-FORD GLASS COMPANY, OF TOLEDO, OHIO, A CORPORATION OF OHIO

SHEET GLASS FLOWING APPARATUS

Substitute for application Serial No. 1,759, filed January 12, 1925. This application filed August 26, 1926. Serial No. 131,785.

The present invention relates to a sheet glass flowing apparatus, and has particular reference to an apparatus wherein molten glass is handled in a manner that it is maintained at a high temperature right up to the point where it leaves the apparatus in sheet form, at which point the glass is instantaneously lowered in temperature to produce a sheet that will be sufficiently strong to sustain its own weight.

An important object of the invention is to provide a sheet glass flowing apparatus wherein a quantity of molten glass is flowed from one member to another in a manner that the temperature of the glass and the viscosity thereof will be made uniform, thus making it possible to produce a very flat, smooth and uniform sheet of glass.

A further object of the invention is to provide a sheet glass flowing apparatus wherein molten glass is continuously overflowed from a suitable tank furnace upon a retarding and equalizing table which is adapted to hold several inches of the molten glass so that the glass which is continuously overflowed upon said table at one end thereof will continuously overflow from the opposite end of the table into a suitable container from which the sheet of glass is flowed.

Still another object of the invention is to provide a sheet glass flowing apparatus wherein a quantity of molten glass is permitted to overflow from one member to another through suitable chambers having a uniform temperature, thus making uniform the temperature and viscosity of the glass.

Still another object of the invention is to provide a sheet glass flowing apparatus adapted to permit a quantity of molten glass to overflow from one member to another to mix the glass thoroughly for producing a stream of uniform glass both as to its temperature and viscosity, by flowing the glass through chambers, the temperature of all the chambers being uniform, thus preventing stagnation and devitrification of the glass, the said overflowing glass being adapted to be received in a trough having a discharge opening through which the molten glass may flow and be subjected to the influence of heat absorbing means, which will give sufficient strength to the sheet thus formed to sustain its own weight.

Other objects and advantages of the invention will be apparent during the course of the following description.

In the drawings wherein like numerals are employed to designate like parts throughout the same, Fig. 1 is a fragmentary vertical longitudinal section through one form of the apparatus, Fig. 2 is a fragmentary transverse section of Fig. 1, Fig. 3 is a vertical longitudinal section showing a slight change over Fig. 1, Fig. 4 is a sectional view disclosing an adjustable equalizing and retarding table, Fig. 5 is a section through the molten glass receiving trough, Fig. 6 is a fragmentary sectional view of the sheet forming apparatus, and includes fire polishing means, Fig. 7 is a vertical longitudinal section through a modified form of construction, and Fig. 8 is a view showing a slightly modified form of receiving trough.

It is well known in the art that a stream of glass flowing through a tank or channel is relatively hotter in the center than along the edges as considerable heat is absorbed by the side walls of such tanks or channels, while at the same time the inherent tendency of the molten glass to adhere creates a drag along the edge portions, thus greatly interfering with the production of a uniform flow of glass from which a flat and smooth sheet of glass can be drawn.

Attempts have been made in the art to equalize the temperature conditions of the molten glass, but as far as I am aware these attempts have not been entirely satisfactory.

In the present invention the molten glass from which the sheet is formed is permitted to overflow from the tank in which the batch is melted upon a retarding or equalizing table, whereby the glass in overflowing from the tank to the table will be permitted to mix, and thus produce a more homogeneous and more uniform pool of glass than that which left the tank. The glass is overflowed from the tank upon one end of the table, and is then permitted to overflow from the opposite end of said table, preferably into a so-called receiving trough. The glass is then permitted to flow through an opening in the trough and subjected to the action of heat absorbing means which are sometimes known as coolers which will absorb sufficient heat from the sheet thus flowed from the trough to prevent a breakdown therein.

In the drawings and especially in Fig. 1, the numeral 10 designates any form of tank furnace wherein the batch is subjected to the action of heat to melt the same and form a pool or mass of molten glass 11. The relatively deep pool of molten glass 11 is permitted to pass into an overflow pot 12 which is adapted to contain a relatively shallow source of glass 13 which is of a high temperature. The discharge pot 12 has the inclined bottom 14, and is provided at its closed end with the lip 15 preferably formed from a non-corrosive alloy, and may be nichrome, Monel or such similar metals. To prevent the escape of heat from the glass 13 in the pot 12, a cover tile 16 is provided.

Arranged below the overflow pot 12 is a table 17 which is preferably called an equalizing or retarding table. This table may be internally heated or cooled as by means of the bore 18 formed therein. Ordinarily the interior of the table should be heated to prevent absorption of heat from the glass which is present upon the same. As is shown, the glass 13 is allowed to overflow the lip 15 in stream formation 19 upon the equalizing table 17. To assist in the overflow a burner 20 may be played upon the glass on the lip 15.

The table 17 is so formed that a relatively very shallow pool of glass 21 is formed from the overflow stream 19. The end 22 is substantially higher than the end 23 which is provided with the lip 24 similar to the lip 15. This is to prevent the pool of glass 21 from overflowing the wrong end. As is shown the pool 21 is adapted to overflow the end 23 of the table 17 in stream-like formation 25. To prevent a lowering in temperature of the glass in its downward fall, burners 26 may be employed in the chamber surrounding the table 17. It is to be borne in mind that I endeavor to maintain the glass which is permitted to overflow at the same temperature as the temperature of the glass 11 in the tank 10. By retaining the glass at this high temperature all tendencies toward stagnation and devitrification will be eliminated as far as possible.

The overflow stream-like formation 25 from the pool 21 is received in a trough 27 preferably formed from a series of contacting pipes through which is adapted to flow a cooling medium such as water or compressed air. The trough 27 is arranged in the chamber 28 a substantial distance from the top 29, leaving sufficient room for the introduction of burners or other suitable forms of heating means 30. If desired, a pool of glass 31 may be permitted to form in the trough 27. The cooling action of the pipes 27 will freeze sufficient glass to prevent leakage from the pool 31, but at the same time, due to the fact that the temperature in the chamber above the cooler and the temperature of the glass is maintained at such a high degree, no trouble should be experienced with freezing up of the trough from the severe action of coolers 27.

Arranged directly below the discharge opening 32 of the trough 27 is a pair of coolers 33 adapted to extend across the length of said opening. The glass 31 is permitted to discharge through the opening 32 in sheet form and is designated by the numeral 34. The coolers 33 will instantaneously absorb heat or cool the sheet 34 as it leaves the opening 32, thus forming a sheet of glass capable of remaining as a unit. As is shown in Fig. 1, coolers 35 of any desired number may be positioned below the discharge opening 32 and coolers 33. The number of coolers 35 will depend upon the thickness of the sheet and the rapidity with which the sheet is formed. With respect to the coolers 33, I preferably locate them slightly out of contact with the sheet 32 so that the sheet will not be exposed to any contacting surface which may cause injury thereto before it has sufficiently set up to withstand such contact. On the other hand, by forming the coolers 33 from a non-corrosive alloy, it is possible to have the sheet 32 drawn from between the said coolers without harm.

In Figs. 1 and 2, I have shown edge-engaging rolls 36 which are used to assist in supporting the flowing weight of the sheet and also assist in maintaining the sheet to width after it has been formed. The rolls 36 are not essential for maintaining the sheet to width as the flowing weight of the glass will be sufficient for this purpose.

To place the apparatus on a commercial basis it may be desirable to deflect the vertical sheet 34 to a horizontal plane, and to accomplish this edge engaging rolls 37 may be used, and as shown the sheet can be drawn therethrough into a horizontal plane and upon the endless conveyor 38. The sheet is then passed on through an annealing leer 39.

Although the sheet is deflected from the vertical to the horizontal plane by means of the edge engaging rolls 37, one large roll may be employed across the entire width of the sheet such as is commonly known in the art as a bending roll.

In Fig. 3 the overflow stream 25 is handled in a slightly different manner in that it is not permitted to form a pool in the trough 27, but is passed straight through the opening 32 without coming in contact with the pipes forming the trough 27.

In Fig. 4 the table 17 is mounted in a manner that it may be adjusted to tilt the end 22 up. This is accomplished by a jack 40 at one end, and the wheel 41 riding on the arcuated track 42 on the opposite end thereof. A pivot pin or bar 43 is passed through the end 23 of the table 17, preferably near the upper edge thereof. The table is mounted in this manner to permit adjustment, while at the same time the overflow stream 25 will be kept in alignment with the opening 32 of the trough 27.

Fig. 5 discloses the action of the overflow stream 25 in the trough 27. In this instance the glass is permitted to become fairly plastic as at 44, but not plastic enough to interfere with the overflow stream 25 from working its way directly through the center as indicated by dotted lines 45. In this instance the sheet 34 does not come in contact with the pipe coolers 27.

In Fig. 6 the edge engaging rolls have been dispensed with, thus permitting the sheet to be formed as rapidly as possible and depending upon the flowing weight of the sheet to maintain the same to width. In this figure is also shown a plurality of burners 46 adapted to play flame 47 upon the surfaces of the sheet to produce a fire polish thereon.

It is to be understood that the number of tables 17 may be increased as desired, and as is shown in Fig. 7, a pair of tables are employed whereby the overflow action of the glass will be increased. By overflowing the glass from one member to another as disclosed, while at the same time keeping a relatively high temperature, it is possible to mix the glass to such an extent that its temperature and plasticity will be equalized and made uniform, this temperature and equal plasticity being maintained right up to the point where it is flowed in sheet formation. Such temperature treatment of the glass should eliminate strains, waves and other deformities present in ordinary sheet glass.

In Fig. 8 the trough is lined with the preferable refractory material 48, having the non-corrosive alloy tips 49. The tips 49 may be internally cooled if desired.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Furthermore, the glass is not exposed to the atmosphere from the time it enters the tank in the form of a batch until it flows through the discharge opening of the trough.

Claims:

1. In sheet glass apparatus, a furnace containing a mass of molten glass and having an outlet at one end thereof, a table arranged in a lower horizontal plane than the outlet end of the furnace and adapted to receive the molten glass therefrom, said table having an overflow lip at one end, a trough arranged below the overflow lip of said table and adapted to receive the molten glass therefrom, said trough comprising a plurality of closely associated pipes constituting the side walls thereof, means for circulating a temperature control medium through said pipes, means for maintaining the glass at a constantly high temperature from the furnace to the trough said glass flowing from the trough in stream form, and means for absorbing heat from the stream as it leaves the trough to form a sheet.

2. In sheet glass apparatus, a furnace containing a mass of molten glass and having an outlet at one end thereof, a table arranged in a lower horizontal plane than the outlet end of the furnace and adapted to receive the molten glass therefrom, said table having an overflow lip at one end, a substantially V-shaped trough arranged below the overflow lip of said table and adapted to receive the molten glass therefrom, said trough comprising a plurality of closely associated, horizontally arranged pipes constituting the side walls thereof, means for circulating a temperature control medium through said pipes, means for maintaining the glass at a constantly high temperature from the furnace to the trough, said glass flowing from the trough in stream form, and means for absorbing heat from the stream as it leaves the trough to form a sheet.

3. In sheet glass apparatus, a receptacle containing a mass of molten glass and from which the glass is adapted to flow downwardly in stream form, a substantially V-shaped trough arranged beneath the receptacle for receiving the glass therefrom, said trough comprising a plurality of closely associated, horizontally arranged pipes constituting the side walls thereof, means for circulating a temperature control medium through said pipes, and means to flow the glass from said trough and form it into a sheet.

4. The process of producing sheet glass, consisting in flowing a stream of molten glass downwardly, collecting the glass within a receptacle to form a pool, cooling the opposite side portions of the pool to render the glass at such points relatively less plastic than the glass at the center of said pool, in maintaining the downwardly flowing stream of glass at a relatively high temperature sufficient to cause it to flow directly through the center of the glass in said pool, and in forming the stream of glass as it leaves the pool into a sheet.

5. The process of producing sheet glass, consisting in flowing a stream of molten glass downwardly, collecting the glass within a receptacle to form a pool, cooling the opposite side portions of the pool to render the glass at such points relatively less plastic than the glass at the center of said pool, in maintaining the downwardly flowing stream of glass at a relatively high temperature sufficient to cause it to flow directly through the center of the glass in said pool, and in absorbing heat from the glass stream as it leaves said pool to form it into a sheet.

6. The procees of producing sheet glass, consisting in flowing molten glass through a heated atmosphere from one receptacle to another to thoroughly mix the same, then flowing the glass downwardly in stream form, collecting the glass within a receptacle to form a pool, cooling the opposite side portions of the pool to render the glass at such points relatively less plastic than the center of said pool, maintaining the downwardly flowing stream of glass at a relatively high temperature sufficient to cause it to flow directly through the center of the glass in said pool, and in absorbing heat from the glass stream as it leaves said pool to form it into a sheet.

Signed at Lancaster, in the county of Fairfield and State of Ohio, this 24th day of August, 1926.

LEOPOLD MAMBOURG.